United States Patent [19]

Strand et al.

[11] Patent Number: 4,676,646
[45] Date of Patent: Jun. 30, 1987

[54] METHOD AND APPARATUS FOR CONTROLLING THICKNESS OF A LAYER OF AN OPTICAL DATA STORAGE DEVICE BY MEASURING AN OPTICAL PROPERTY OF THE LAYER

[75] Inventors: David Strand, West Bloomfield; John Vala, Plymouth, both of Mich.

[73] Assignee: Energy Conversion Devices, Inc., Troy, Mich.

[21] Appl. No.: 787,333

[22] Filed: Oct. 15, 1985

[51] Int. Cl.[4] .............................................. G01B 11/02
[52] U.S. Cl. ........................................ 356/381; 427/10
[58] Field of Search .................. 356/381, 382; 427/10, 427/164

[56] References Cited

U.S. PATENT DOCUMENTS 3,492,491  1/1970  Beeh ..................................... 356/381
4,457,794  7/1984  Kotera et al. ........................ 427/10

Primary Examiner—F. L. Evans
Attorney, Agent, or Firm—Lawrence G. Norris; Marvin S. Siskind; Richard M. Goldman

[57] ABSTRACT

Disclosed is a method and apparatus for depositing material on a substrate by periodically measuring an optical property of a region thereof, thereby obtaining a substantially continuous profile of the property for that region. The measured value of the property is compared with a predetermined value, and when the two values are substantially equal, deposition is terminated, thereby resulting in correct and reproducible layer thicknesses.

10 Claims, 9 Drawing Figures

FIG. 1
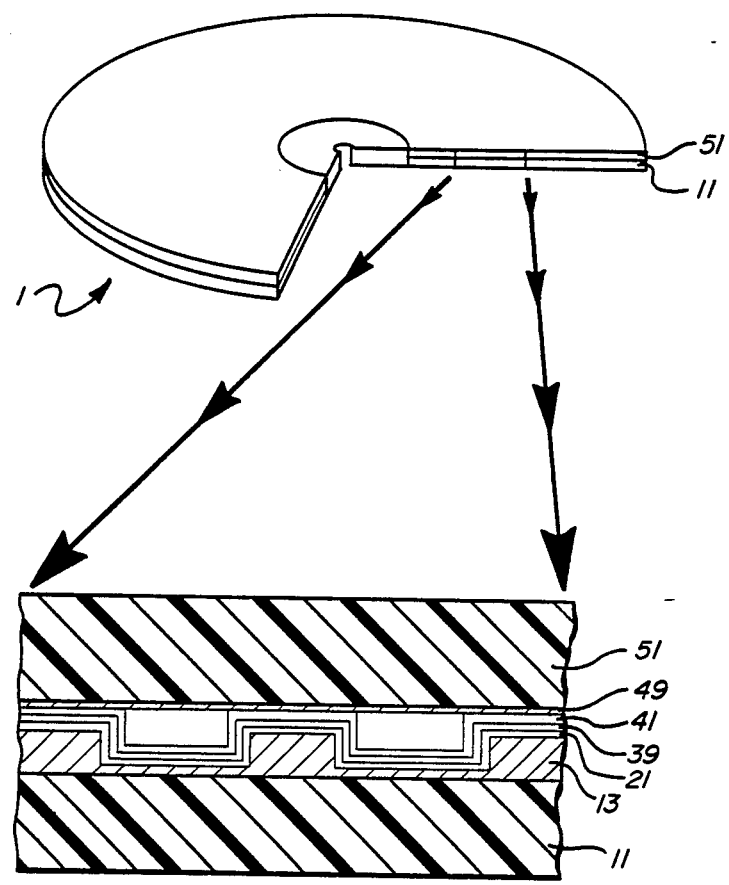
FIG. 1A
FIG. 2A
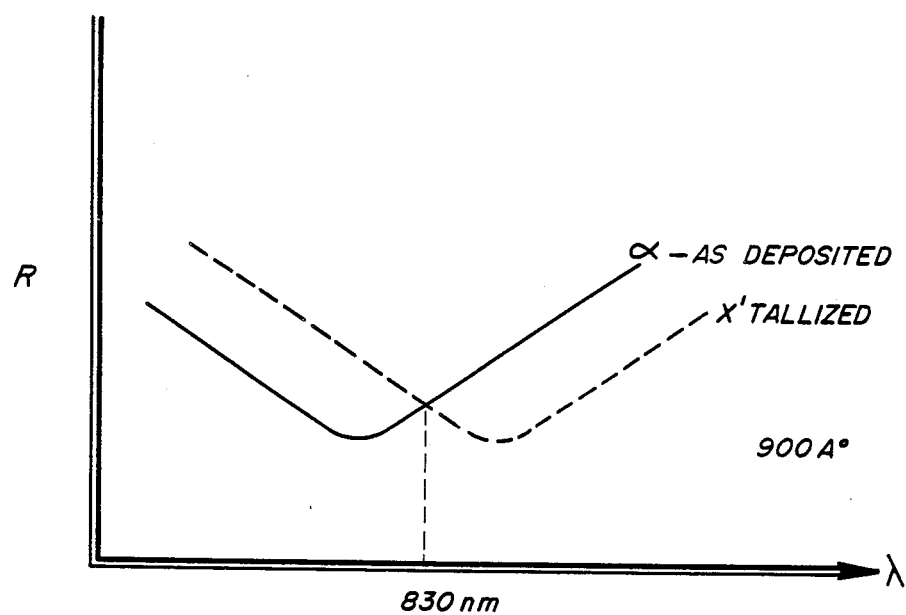

METHOD AND APPARATUS FOR CONTROLLING THICKNESS OF A LAYER OF AN OPTICAL DATA STORAGE DEVICE BY MEASURING AN OPTICAL PROPERTY OF THE LAYER

FIELD OF THE INVENTION

The invention disclosed herein relates to methods of manufacturing data storage devices and apparatus for manufacturing the data storage devices, where data is stored in a material that is switchable between detectable states by the application of projected beam energy thereto.

BACKGROUND OF THE INVENTION

Nonablative state changeable data storage systems, for example, optical data storage systems, record information in a state changeable material that is switchable between at least two detectable states by the application of projected beam energy thereto, for example, optical energy. Data may be stored reversibly or irreversibly. When optical energy is used to determine the state of the state changeable material, the measured property may be the reflectivity. Reflectivity is a function of wavelength, material thickness, and index of refraction, where the index of refraction is a function of the state of the material.

State changeable data storage material is incorporated in a data storage device having a structure such that the data storage material is supported by a substrate and encapsulated in encapsulants. In the case of optical data storage devices the encapsulants include, for example, anti-ablation materials and layers, thermal insulation materials and layers, anti-reflection materials and layers, reflective layers, and chemical isolation layers. Moreover, various layers may perform more than one of these functions. For example, anti-reflection layers may also be anti-ablation layers and thermal insulating layers. The thicknesses of the layers, including the layer of state changeable data storage material, are optimized to minimize the energy necessary for state change and maximize the high contrast ratio, high carrier to noise ratio, and high stability of state changeable data storage materials.

The state changeable material is a material capable of being reversibly or irreversibly switched from one detectable state to another detectable state or states by the application of projected beam energy thereto. State changeable materials are such that the detectable states may differ in their morphology, surface topography, relative degree of order, relative degree of disorder, electrical properties, optical properties including indices of refraction and reflectivity, or combinations of one or more of these properties. The state of state changeable material is detectable by the electrical conductivity, electrical resistivity, optical transmissivity, optical absorption, optical refraction, optical reflectivity, or combinations thereof.

Formation of the data storage device includes deposition of the individual layers, for example by evaporative deposition, chemical vapor deposition, and/or plasma deposition. As used herein plasma deposition includes sputtering, glow discharge, and plasma assisted chemical vapor deposition.

Tellurium based materials have been utilized as state changeable materials for data storage where the state change is a structural change evidenced by a change in reflectivity. This effect is described, for example, in J. Feinleib, J. deNeufville, S.C. Moss, and S.R. Ovshinsky, "Rapid Reversible Light-Induced Crystallization of Amorphous Semiconductors," *Appl. Phys. Lett.*, Vol. 18(6), pages 254–257 (Mar. 15, 1971), and in U.S. Pat. No. 3,530,441 to S.R. Ovshinsky for *Method and Apparatus For Storing And Retrieving Of Information*. A recent description of tellurium-germanium-tin systems, without oxygen, is in M. Chen, K.A. Rubin, V. Marrello, U.G. Gerber, and V.B. Jipson, "Reversibility And Stability of Tellurium Alloys for Optical Data Storage," *Appl. Phys. Lett.*, Vol. 46(8), pages 734–736 (Apr. 15, 1985). A recent description of tellurium-germanium-tin systems with oxygen is in M. Takanaga, N. Yamada, S. Ohara, K. Nishiciuchi, M. Nagashima, T. Kashibara, S. Nakamura, and T. Yamashita, "New Optical Erasable Medium Using Tellurium Suboxide Thin Film," *Proceedings, SPIE Conference on Optical Data Storage*, Arlington, VA, 1983, pages 173–177.

Tellurium based state changeable materials, in general, are single or multi-phased systems (1) where the ordering phenomena include a nucleation and growth process (including both or either homogeneous and heterogeneous nucleations) to convert a system of disordered materials to a system of ordered and disordered materials, and (2) where the vitrification phenomenon includes melting and rapid quenching of the phase changeable material to transform a system of disordered and ordered materials to a system of largely disordered materials. The above phase changes and separations occur over relatively small distances, with intimate interlocking of the phases and gross structural discrimination, and are highly sensitive to local variations in stoichiometry.

A major limitation of optical data storage devices is lack of reproducability of the contrast from one production run to the next. The contrast is the difference between the reflectivity of the optical data storage material in one state and its reflectivity in another state. Reflectivity is affected by interference phenomena. The reflectivity of the optical data storage medium is dependent on the thickness of the film of the optical data storage medium, the wavelength of the projected beam optical energy used for interrogation, and the index of refraction of the optical data storage medium.

The interrogation means is typically a monochromatic light source. The wave length of this monochromatic light source defines the wave length for interference phenomena.

The index of refraction can be controlled by control of the chemical composition of the medium. This includes control of the composition of, for example, sputtering targets, evaporation sources, and chemical vapor deposition gases.

Thickness is a more difficult variable than composition to control. Thickness of deposited thin films have heretofore been controlled by, for example, simultaneously coating the substrate to be coated and an oscillator. The oscillator frequency is a indirect function of coating thickness. The difference in oscillator frequency from the beginning of a deposition run to the end of the deposition run can be correlated with the deposition thickness. The deposition thickness then determines the reflectivity of the deposition for a given refractive index.

Thickness may also be controlled by measuring the optical thickness or optical density of the deposit. For example, U.S. Pat. No. 3,773,548 to Baker, et al for METHOD OF MONITORING THE RATE OF DEPOSITING A COATING SOLELY BY ITS OPTICAL PROPERTIES describes a process where coating thickness is controlled by measuring the optical density of an evaporated coating on a continuously advancing substrate. In Baker the optical density of a point is measured only once. This measurement is used to control the deposition rate at a prior deposition station.

Thickness may also be measured by determing the interference fringes of the coating, as described, for example, by Alvin Goodman "Optical Interference Method for the Approximate Determination of Refractive Index and Thickness of a Transparent Layer", *Applied Optics,* Vol 17 (No.17), pages 2779-2787 (September 1978), and R. D. Pierce and W. B. Venard, "Thickness Measurements of Films On Transparent Substrates By Photoelectric Detection of Interference Fringes", Rev. Sc. Instrum., Vol. 45 (No. 1), pages 14-15 (January 1974).

SUMMARY OF THE INVENTION

According to the invention herein contemplated, there is provided a method of and a system for manufacturing an optical data storage device. The data storage device has a chalcogenide data storage medium, a substrate supporting the medium, and a dielectric film encapsulating the chalcogenide data storage medium.

According to the invention described herein, there is provided a method of manufacturing an optical data storage device having the optical data storage medium supported by the substrate. The optical data storage medium is switchable between optically detectable states by the application of a projected beam thereto. The method of the invention resides in providing the optical data storage medium material precursor from a source, providing periodic motion to the optical data storage device substrate with respect to the source of optical data storage medium material precursor; and depositing the optical data storage medium material precursor on a subjacent layer of the optical data storage device to form a film of condensed optical data storage medium. According to the method of the invention, the problem of poor run to run reproducability is obviated by substantially continuously and/or repeatedly measuring an optical property of the film of deposited optical data storage medium during deposition whereby to periodically measure the optical property of a representative region of the deposited optical data storage medium. This measured optical property is compared to a predetermined value of the optical property, and deposition is terminated when the measured value of the optical property substantially equals the predetermined value of the optical property.

Similarly, the thickness of either or both of the dielectric layers may be controlled in the same way. The top dielectric layer is treated in the same way as described for the state changeable layer. In the case of the bottom dielectric layer, the reflectivity of the deposit on a reference sample, which may contain an already deposited layer of state changeable material, is monitored during deposition. In that way, deposition of the bottom dielectric layer may be controlled by monitoring its reflectivity, for example, under actual use conditions, as next to a state changeable layer.

Exemplary chalcogenide compositions useful in providing the chalcogen data storage medium include tellurium, for example, where the tellurium is present with a cross linking agent or agents. The chalcogenide composition may be reversibly switchable between (1) a substantially amorphous, first tellurium-cross linking agent composition and (2) a more ordered tellurium composition, possibly locally precipitated, in the presence of an amorphous, second tellurium-cross linking agent composition.

Suitable cross linking agents are elements of groups IIIB, IVB, and VB of the Periodic Table. These include aluminium, indium, and gallium from Group IIIB, silicon, germanium and tin from Group IVB, nitrogen, phosphorous, arsenic, antimony, and bismuth from Group VB, as well as combinations thereof. Exemplary cross linking agents from Groups IIIB, IVB, and VB of the periodic table include silicon, germanium, tin, arsenic, antimony, and mixtures thereof, expecially silicon, and/or germanium, either alone or with one or more of tin, arsenic, or antimony. Especially preferred is germanium, either alone, or with tin. Additionally, further light chalcogen, as selenium and sulphur, may be present.

Exemplary chalcogen compositions include the chalcogen e.g. tellurium, and a cross linking agent, e.g. silicon and/or germanium, or silicon and/or germanium with another cross linking agent in the medium sufficient to form a stable chalcoginide. Additionally oxygen, or a switching modulator, as Ni, Pt, or Pd, may be present. Generally, the atomic ratio of the cross linking agent to total composition is from about 1 percent to about 20 atomic percent.

The data storage medium may be formed by depositing the materials to form a substantially uniform deposit thereof. The deposit may be from about 100 to about 1500 or more Angstroms thick.

THE FIGURES

The invention may be particularly understood by reference to the drawings appended hereto.

FIG. 1 is a partial cut away isometric view, not to scale, with exaggerated latitudinal dimensions and vertical scale, of an optical data storage device.

FIG. 1A is a detailed section of the part of the optical data storage device of FIG. 1 showing the relationship of the various layers thereof.

FIG. 2A through 2C show the reflectivities, both "as deposited" and "crystallized", for various thicknesses of the telluride optical data storage medium film.

DETAILED DESCRIPTION OF THE INVENTION

Figure 2B:
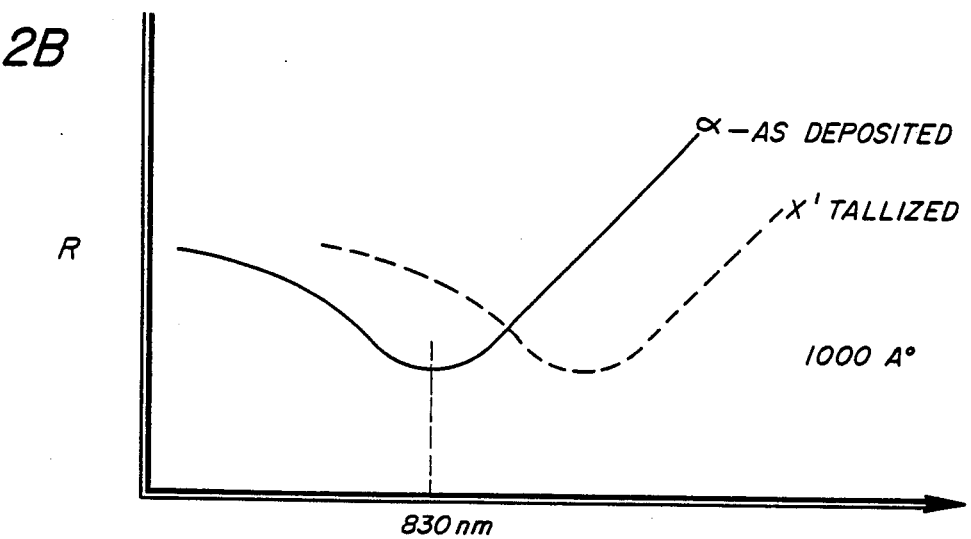

According to the invention described herein, there is provided a method of and apparatus for manufacturing a projected beam data storage device having a data storage medium switchable between detectable states by the application of projected beam energy thereto.

FIGS. 1 and 1A show a projected beam data storage device 1 having a substrate, for example a plastic substrate 11, a first encapsulating dielectric layer 21, for example a first germanium oxide encapsulating layer, a chalcogen data storage medium layer 31, a second dielectric layer 41, e.g., a second germanium oxide layer 41, and a second substrate, e.g., plastic substrate 51.

FIG. 1A shows a section of the data storage device 1 of FIG. 1 in greater detail. As there shown, the substrate 11 is a polymeric sheet, for example a polymethyl methacrylate sheet. The substrate 11 is an optically invariant, optically isotropic, transparent sheet having a thickness such as to prevent optical interference with the projected beam data storage medium from greasy or oily films, or inclusions of dirt, dust, fingerprints, or foreign material. The preferred thickness is of from about 1 mm to about 1.5 mm.

Atop the substrate sheet 11 is a second sheet 13, e.g., a photoinitiated, polymerized acrylic sheet. Polymerized, molded, or cast into the photoinitiated, polymerized acrylic sheet 13 may be grooves. When grooves are present they may have a thickness from about 500 to about 1000 Angstroms. The photoinitiated, polymerized acrylic sheet 13 has a thickness of from about 30 to about 200 microns and preferably from about 50 to about 100 microns.

Deposited atop the photo-polymerized sheet 13 is a dielectric barrier layer 21. The dielectric barrier layer 21, for example, of germanium oxide, is from about 500 to about 2000 angstroms thick. The dielectric barrier layer 21 has one or more functions. It serves to prevent oxidizing agents from getting to the chalcogen active layer 31 and prevents the plastic substrate from deforming due to local heating of the chalcogenide layer 31, e.g., during recording or erasing. The barrier layer 21 also serves as an anti-reflective coating, increasing the optical sensitivity of the chalcogen active layer 31.

Other dielectrics may provide the encapsulating layers 21, 41. For example, the encapsulating layers may be silicon nitride, layered or graded to avoid diffusion of silicon into the chalcogenide layer 31. Alternatively, the encapsulating dielectric layers 21, 41 may be silica, alumina, or other dielectric.

The chalcogenide data storage medium 31 has a thickness of from about 100 to about 1500 angstroms. The exact thickness of the chalcogenide data storage medium is a function of the wavelength of the interrogating laser and the indices of refraction of the states of the chalcogenide.

Atop the chalcogenide layer 31 and in contact with the opposite surface thereof is a second dielectric layer 41, e.g., a germanium oxide layer. The second dielectric layer 41 may, but need not be of equal thickness as the first layer 21. A second photopolymer layer 49 and a second substrate layer 51 are in contact with the opposite surface of the encapsulating layer 41.

The polyacrylate layers 13, 49, are cast or molded in place. These layers 13, 49 can be photo-polymerized in place, e.g., by the application of ultra-violet light. The barrier layers 21, 41, are deposited, by evaporation, for example, of germanium and germanium oxide materials, or by sputtering, including reactive sputtering where the oxygen content of the reactive gas used in reactive sputtering is controlled. The chalcogenide film 31 may be prepared by evaporation, or by sputtering, or by chemical vapor deposition.

Figure 2C:
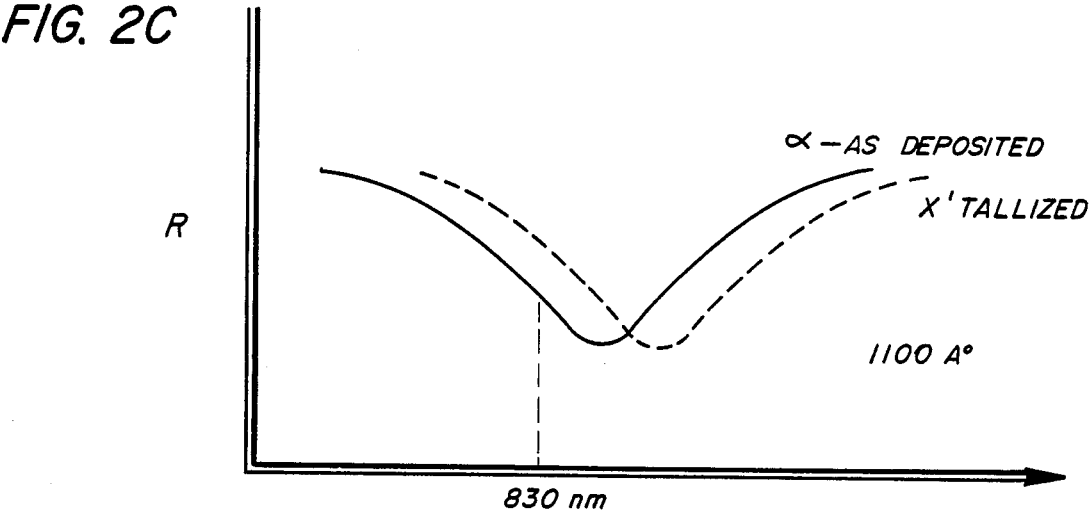

FIGS. 2A, 2B, and 2C illustrate the effects of the thickness of the deposited coating on the individual reflectivities, and therefore, on the contrast ratio.

FIG. 2A shows the relative reflectivity in an arbitrarily chosen 900 Angstrom thick layer, versus wavelength of the laser beam for both the disordered, as deposited, material and the crystallized material. At a deposit thickness of 900 Angstroms, the as deposited material and the crystallized material have substantially the same reflectivity.

FIG. 2B shows the reflectivity versus wavelength for a 1000 Angstrom thick deposit. At 830 nanometers the reflectivity of the as deposited material is substantially less than the reflectivity of the crystallized material.

FIG. 2C shows the reflectivity versus wavelength for an 1100 Angstrom thick layer. At 1100 Angstroms, the reflectivity curves have shifted even further so that they are substantially parallel and may even be superimposed on each other and the reflectivities for 830 nanometer optical energy are again substantially equal.

Figure 3:
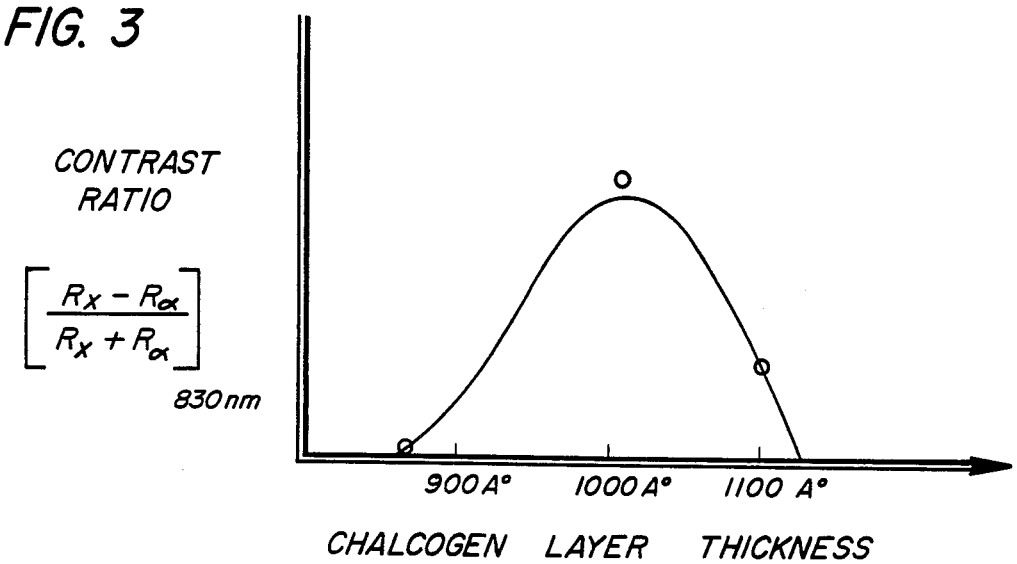
FIG. 3 is a representation of the contrast ratio (R crystalline−R amorphous)/R crystalline+R amorphous) using an 830 nanometer laser, as a function of thickness.

FIG. 3 shows the contrast ratio, ($R_{crystalline} - R_{amorphous}/R_{crystalline} + R_{amorphous}$) with an 830 nanometer laser beam as a function of chalcogenide layer thickness. As there shown, the contrast ratio reaches a relative peak at approximately 1000 Angstroms thickness, dropping off rather sharply towards both 900 Angstroms and 1100 Angstroms.

Figure 4:
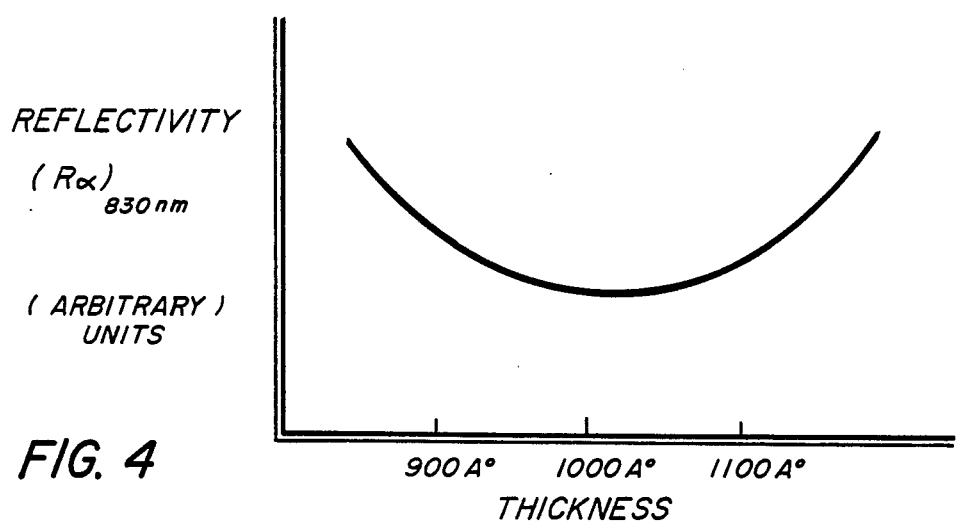
FIG. 4 is a representation of the reflectivity using an 830 nanometer laser in the as deposited state of the chalcogenide layer as a function of thickness.

FIG. 4 shows the reflectivity of the as deposited material in arbitrary units versus thickness for an 830 nanometer laser light. The reflectivity of the as deposited film reaches a relative minimum at about 1000 angstroms.

According to the invention herein contemplated, the thickness is either repeatedly or substantially continuously monitored while depositing the material precursor, e.g. optical data storage medium material precursor, such as chalcogens like tellurium, with alloying elements from one or more sources, onto the subjacent layer to form a film of the condensed material, e.g., optical data storage medium. This provides periodic measurement of an optical property of a selected region of the film. The optical property may be the ultimate optical property, i.e., reflectivity. If the optical property is reflectivity, deposition is controlled by continuously measuring the reflectivity of the deposited material, e.g. optical data storage medium, whereby to periodically measure the reflectivity of a particular region of interest. The optical property, e.g. reflectivity of a region, is representative of the same optical properties of the entire deposit.

The measurement of the optical property, e.g., reflectivity, is continued until a predetermined value is attained, for example, a minimum or relative minimum as shown in FIG. 4 corresponding to a thickness of about 1000 angstroms. When the predetermined value is attained, e.g., with respect to time delays of the measurement and deposition systems, the deposition of the optical data storage material is terminated.

The periodic motion provided to the optical data storage device substrate with respect to the deposition source is such that the regions of the device are periodically instantaneously preferentially exposed to the source of material precursor, e.g., optical data storage medium material precursor, and the entire surface of the optical data storage device is substantially uniformly exposed to the source of material precursor, e.g., optical data storage medium material precursor, over an extended period of time with respect to the time period of the periodic motion. The deposition per rotation is less than about one percent of the total thickness of the ultimate film of the material, e.g., optical data storage medium. The optical sensor may substantially continuously scan an entire track of a rotating or reciprocating optical data storage device in such a way that the track is substantially continuously monitored and a particular region thereof is instantaneously monitored substantially periodically. By this expedient, the thickness of the deposit is substantially continuously profiled with respect to time.

When the thickness of the deposit reaches a value corresponding to the predetermined reflectivity of the as deposited material, the deposition is terminated, for example, by closing an aperture of an evaporation system, by discontinuing the energy to a sputtering system, or by discontinuing the energy or flow of reactants or both through a chemical vapor deposition system.

Figure 5:
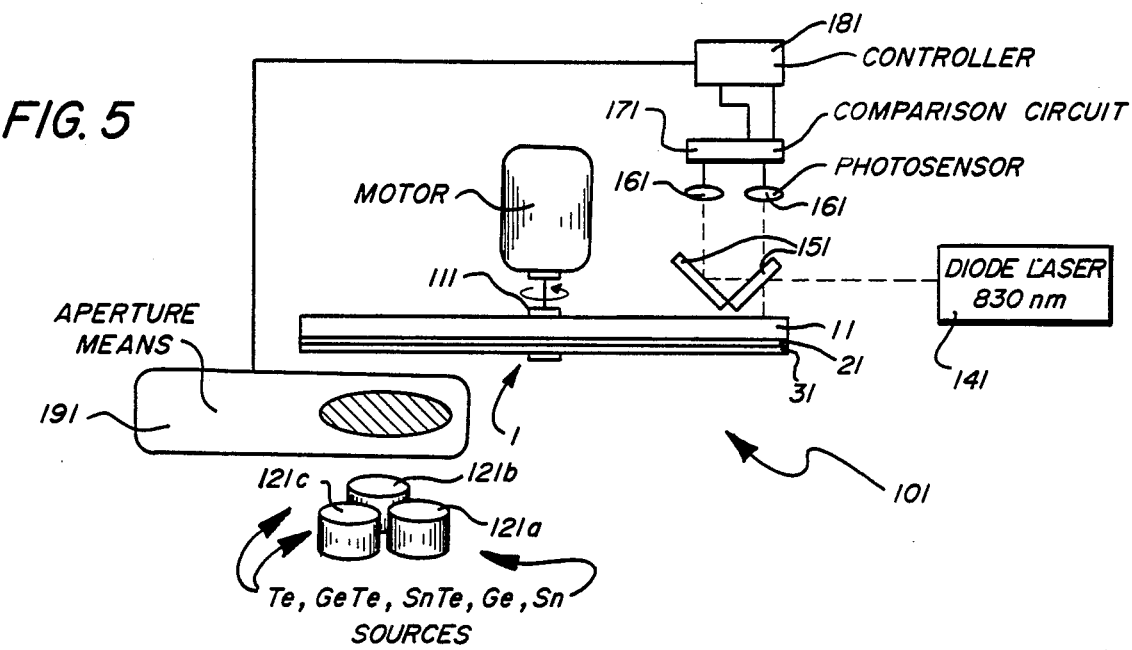
FIG. 5 is a schematic view of one exemplification of a deposition system of the invention.
Figure 6:
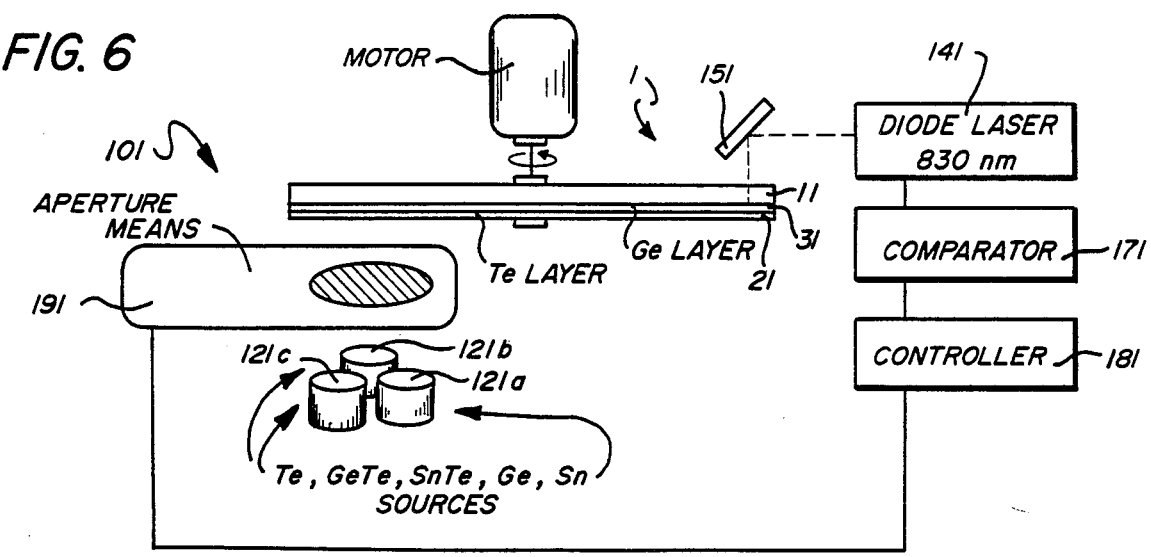
FIG. 6 is a schematic view of an alternative exemplification of a deposition system of the invention.

Systems for carrying out the deposition method of the invention are shown in FIGS. 5 and 6. As there shown, there is provided a system 101 for manufacturing an optical data storage device 1 as described above. The system 101 includes means 111, for example, rotating means 111 for supporting the optical data storage device 1. Source means 121a, 121b and 121c are provided for controllably providing material precursor, e.g., optical data storage medium material precursor, for subsequent deposit in a condensed state on the optical data storage device 1. The source means 121a, 121b and 121c may be individual or multiple sputtering targets, individual or multiple heated crucibles, or individual or multiple sources of chemical vapor deposition reagents.

The system further includes means 131 for providing periodic motion to the optical data storage device 1 with respect to the source means 121a, 121b and 121c. While FIGS. 5 and 6 show this as being rotating means 131 for rotating the source means, the means for providing relative motion may include means for providing alternative modes of periodic motion, such as reciprocating or rotating means.

The system further includes means for substantially continuously measuring an optical property of the condensed deposit of the material, e.g., optical data storage medium material, on the optical data storage device 1. In FIG. 5, this is accomplished by a diode laser 141 having a characteristic wavelength of 830 nanometers. The diode laser 141 provides light to an optical system including a beam splitter 151. Light reflected from the optical data storage device 1 goes to a photosensor 161 and a comparator circuit 171. When a predetermined value of reflectivity is attained, a controller 181 closes aperture means 191 over the source means 121a, 121b, 121c, of optical data storage medium material precursor.

An alternative system shown in FIG. 6 measures reflectivity through the substrate and barrier layer to the chalcogenide layer. The system 101 shown in FIG. 6 further includes beam splitter means 151, photosensor means 161, comparison circuit means 171, and controller means 181.

According to the invention herein contemplated, there is provided a method of manufacturing an optical data storage device. The optical data storage device has an optical data storage medium layer formed of a thin film, supported by a substrate. The optical data storage medium is switchable between optically detectable states by the application projected beam energy thereto.

According to the invention herein contemplated, the medium precursor is deposited from a source or sources thereof. The sources may be vapor sources, for example, sputtering, evaporation, or chemical vapor deposition. In the method of depositing the material, e.g., optical data storage medium, on the device, a periodic motion is applied to the device with respect to the source. For example, the source may be a mobile source, or the source may be a stationary source with a moveable aperture or movable distributor thereon, or the source may be a stationary source and the device itself may move with respect to the source. The movement may be rotatory or reciprocatory. For example, periodic motion may be applied to the device substrate with respect to the source such that the regions of the device are periodically instantaneously preferentially exposed to source of material precursor, e.g., optical data storage medium material precursor. In this way, the entire surface of the device is substantially uniformly exposed to the source of material precursor, e.g. optical storage medium material precursor, over an extended period of time with respect to the periodic motion.

The film deposited during one period or rotation is less than about one percent of the total thickness of the ultimate deposited film.

The data storage medium is deposited on the device to form a film of material, e.g., optical data storage medium, thereon. According to the method of the invention, an optical property of the film of deposited material is substantially continuously measured. This results in periodically measuring the optical property of the region of the deposit. The measured optical property is compared with a predetermined value of the optical property and the deposition of the material is terminated when the measured value of the optical property substantially equals a predetermined value thereof.

Most commonly, the optically detectable states of the optical data storage medium are evidenced by the reflectivities thereof, and it is the reflectivity that is measured during deposition.

According to a further exemplification of the invention, there is provided a system for manufacturing an optical data storage device, the device having a substrate and a vapor deposited layer of state changeable optical data storage medium thereon. The deposition system includes means for supporting the optical data storage device and source means, which may include one or more individual sources. The source means controllably provide material precursor, e.g., optical data storage medium material precursor, for deposit in a condensed state on the optical data storage device. The system further includes means for providing periodic motion to the optical data storage device with respect to the source means. For example, the source may be a moving source. Alternatively, the source may be a stationary source with a moving aperture. Alternatively, and preferably, the data storage device moves, for example, with rotational or reciprocating motion.

The system further includes means for substantially continuously: (1) measuring an optical property of the film, i.e., condensed deposit of material on the optical data storage device, (2) comparing the measured optical property to a predetermined value thereof, and (3) controlling the source means with respect thereto, e.g., terminating deposition when the measured value substantially equals the predetermined value.

The means for providing the periodic motion to the optical data storage device with respect to the source means is the rotational means. The rotational means provide rotational motion to the optical data storage device with respect to the source means. Thus, the regions of the device are periodically instantaneously preferentially exposed to the source means and the entire surface of the device is substantially uniformly exposed to the source means over an extended time with respect to the periodic motion. The period of the periodic motion is set or regulated with respect to the deposition rate such that the deposition of optical data storage medium per period is less than about one percent of the total thickness of the ultimate film of optical data storage medium.

The source means may be evaporation means, sputtering means, or chemical vapor deposition means. The optical property measured is preferably the reflectivity. The means for measuring the reflectivity include laser means. The material being deposited may be optical data storage medium. Alternatively, it may be dielectric encapsulating material.

While the invention has been described with respect to certain preferred exemplifications and embodiments thereof it is not intended to be bound thereby but solely by the claims appended hereto.

What we claim is:

1. A method of manufacturing an optical data storage device having a reversible, chalcogenide, optical data storage medium layer comprising tellurium and a cross-linking agent, said layer being encapsulated between dielectric layers and supported by a device substrate, said optical data storage device being manufactured by a method comprising the steps of:
   (a) providing rotational motion to the device substrate;
   (b) providing precursor of the dielectric from a source thereof;
   (c) depositing the dielectric precursor to form a first dielectric film thereon;
   (d) periodically measuring an optical property of the first dielectric film whereby to substantially continuously monitor the optical property of the first dielectric film;
   (e) comparing the measured optical property of the first dielectric film to a predetermined value thereof;
   (f) terminating deposition of the dielectric material and the build-up of the first dielectric film when the measured value of the optical property of the first dielectric film substantially equals the predetermined value thereof;
   (g) providing a chalcogen and cross-linking agent precursor of the chalcogenide optical data storage medium layer from a source thereof;
   (h) depositing the chalcogen and cross-linking agent atop the first dielectric film to form a layer of reversible chalcogenide optical data storage medium material atop the first dielectric film;
   (i) periodically measuring an optical property of the layer of reversible chalcogenide optical data storage medium material atop the first dielectric film whereby to substantially continuously monitor the optical property of the reversible chalcogenide optical data storage medium material;
   (j) comparing the measured optical property of the layer of reversible chalcogenide optical data storage medium material to a predetermined value thereof;
   (k) terminating deposition of the reversible chalcogenide optical data storage medium material and the build-up of the layer when the measured value of the optical property of the layer substantially equals the predetermined value thereof;
   (l) resuming deposition of the dielectric precursor to form a second dielectric film atop the reversible chalcogenide optical data storage medium material layer;
   (m) periodically measuring an optical property of the second dielectric film whereby to substantially continuously monitor the optical property of the second dielectric film;
   (n) comparing the measured optical property of the second dielectric film to a predetermined value thereof; and
   (o) terminating deposition of the dielectric material and the build-up of the second dielectric film when the measured value of the optical property of the second dielectric film substantially equals the predetermined value thereof.

2. The method of claim 1 wherein the deposition per rotation is less than one percent of the total thickness of the ultimate film of optical data storage medium.

3. The method of claim 1, wherein the dielectric encapsulating material is a germanium oxide.

4. The method of claim 1 comprising providing material precursor by evaporation.

5. The method of claim 1 comprising providing material precursor by sputtering.

6. The method of claim 1 comprising providing material precursor in a non-condensed state by chemical vapor deposition.

7. The method of claim 1 comprising providing rotational motion to the device substrate with respect to the source whereby regions of the device are periodically instantaneously preferentially exposed to the source of material precursor and the entire surface of the device is substantially uniformly exposed to the source of optical data storage medium material precursor over an extended time with respect to the periodic motion.

8. A method of manufacturing an optical data storage device having a reversible, germanium telluride, optical data storage medium layer, said germanium telluride layer being encapsulated between germanium oxide dielectric layers and supported by a device substrate, said optical data storage device being manufactured by a method comprising the steps of:
   (a) providing rotational motion to the device substrate;
   (b) providing germanium oxide vapor from a source thereof;
   (c) depositing the germanium oxide to form a first germanium oxide dielectric film thereon;
   (d) periodically measuring the reflectivity of the first germanium oxide dielectric film whereby to substantially continuously monitor the reflectivity thereof;
   (e) comparing the measured reflectivity of the first dielectric film to a predetermined value thereof;
   (f) terminating deposition of the germanium oxide and the build-up of the first germanium oxide dielectric film when the measured value of the reflectivity of the first germanium oxide dielectric film substantially equals the predetermined value thereof;
   (g) providing vapor precursors of the germanium telluride optical data storage medium layer from sources thereof;
   (h) depositing germanium and tellurium atop the first germanium oxide dielectric film to form a layer of germanium telluride reversible, phase change optical data storage medium material atop the first germanium oxide dielectric film;

(i) periodically measuring the reflectivity of the layer of germanium telluride reversible, phase change optical data storage medium material atop the first germanium oxide dielectric film whereby to substantially continuously monitor the reflectivity of the germainium telluride, reversible phase change, optical data storage medium material;

(j) comparing the measured reflectivity of the layer of germanium telluride, reversible, optical data storage medium material to the minimum value thereof;

(k) terminating deposition of the reversible chalcogenide optical data storage medium material layer and the build-up of the layer when the measured value of the reflectivity of the layer substantially equals the minimum value thereof;

(l) resuming deposition of the germanium oxide precursor to form a germanium oxide second dielectric film atop the germanium telluride, reversible optical data storage medium material layer;

(m) periodically measuring the reflectivity of the second germanium oxide dielectric film whereby to substantially continuously monitor the feflectivity of the second germanium oxide dielectric film;

(n) comparing the reflectivity of the second germanium oxide dielectric film to a predetermined value thereof; and (o) terminating deposition of the germanium oxide dielectric material and the build-up of the second germanium oxide dielectric film when the measured value of the optical property of the second dielectric film substantially equals the predetermined value thereof.

9. A system for manufacturing an optical data storage device, and device having a reversible, chalcogenide, optical data storage medium layer comprising tellurium and a cross-linking agent, said layer being encapsulated between dielectric layers and supported by a substrate, said manufacturing system comprising:

(a) means for supporting the optical data storage device;

(b) source means for controllably providing (i) telluride optical data storage medium layer precursor vapor and (ii) dielectric layer precursor vapor for deposit in a condensed state to form the optical data storage device;

(c) means for providing rotational motion to the optical data storage device with respect to the source means;

(d) means for substantially continuously measuring the reflectivities of the condensed deposits of dielectric encapsulating layers and optical data storage medium layer on the optical storage device; and (e) means for (1) comparing the measured reflectivity of a layer to a predetermined value thereof, and (2) controlling the evolution of vapor from the source means with respect thereto whereby to control the thickness of the layer.

10. The system of claim 9 wherein the rotational means provide rotational motion to the optical data storage device with respect to the source means whereby regions of the device are periodically instantaneously preferentially exposed to the source means and the entire surface of the device is substantially uniformly exposed to the source means over an extended time with respect to the periodic motion.

* * * * *